United States Patent [19]

Grubbs

[11] Patent Number: 4,723,098
[45] Date of Patent: Feb. 2, 1988

[54] ELECTRONIC BALLAST CIRCUIT FOR FLUORESCENT LAMPS

[75] Inventor: Calvin E. Grubbs, Garland, Tex.

[73] Assignee: Thomas Industries, Inc., Louisville, Ky.

[21] Appl. No.: 33,701

[22] Filed: Apr. 3, 1987

Related U.S. Application Data

[63] Continuation of Ser. No. 661,397, Oct. 16, 1984, abandoned, which is a continuation-in-part of Ser. No. 194,783, Oct. 7, 1980, Pat. No. 4,477,748.

[51] Int. Cl.$^4$ .................. G05F 1/00; H05B 37/02; H05B 39/04; H05B 41/36
[52] U.S. Cl. .................. 315/306; 323/277; 323/280; 363/19; 363/74; 315/239; 315/242; 315/244; 315/291; 315/DIG. 7
[58] Field of Search .............. 315/239, 241, 242, 244, 315/247, 306, 307, 308, 310, 311, 194, 206; 323/265, 277, 280; 363/19, 74

[56] References Cited

U.S. PATENT DOCUMENTS

| | | | |
|---|---|---|---|
| 2,928,994 | 3/1960 | Widakowich | 315/205 |
| 3,047,789 | 7/1962 | Lowry | 321/18 |
| 3,072,822 | 1/1963 | Holmes | 315/107 |
| 3,265,930 | 8/1966 | Powell, Jr. | 315/209 |
| 3,449,629 | 6/1969 | Wigert et al. | 315/151 |
| 3,541,421 | 11/1970 | Buchman | 320/1 |
| 3,611,021 | 10/1971 | Wallace | 315/239 |
| 3,648,106 | 3/1972 | Engel et al. | 315/291 |
| 3,662,216 | 5/1972 | Hildebrant | 315/205 |
| 3,681,654 | 8/1972 | Quinn | 315/151 |
| 3,684,919 | 8/1972 | Cramer | 315/194 |
| 3,719,858 | 3/1973 | Gilbreath | 317/16 |
| 3,821,601 | 6/1974 | Kappenhagen et al. | 315/311 |
| 3,879,652 | 4/1975 | Billings | 315/225 |
| 3,885,197 | 5/1975 | Moses | 315/194 |
| 3,890,537 | 6/1975 | Park et al. | 315/208 |
| 3,890,562 | 6/1975 | West | 323/14 |
| 3,904,922 | 9/1975 | Webb et al. | 315/151 |
| 3,936,726 | 2/1976 | Kelley, Jr. | 323/24 |
| 3,969,652 | 7/1976 | Herzog | 315/224 |
| 3,999,100 | 12/1976 | Dendy et al. | 315/308 |
| 4,004,188 | 1/1977 | Cooper | 315/261 |
| 4,042,856 | 8/1977 | Steigerwald | 315/246 |
| 4,060,752 | 11/1977 | Walker | 315/307 |
| 4,127,798 | 11/1978 | Anderson | 315/209 R |
| 4,200,830 | 4/1980 | Oughton et al. | 320/20 |
| 4,210,846 | 7/1980 | Capewell et al. | 315/121 |
| 4,220,896 | 9/1980 | Paice | 315/307 |
| 4,238,710 | 12/1980 | Nelson | 315/307 |
| 4,240,009 | 12/1980 | Paul | 315/224 |
| 4,251,752 | 2/1981 | Stolz | 315/306 |
| 4,253,046 | 2/1981 | Gerhard et al. | 315/224 |

(List continued on next page.)

FOREIGN PATENT DOCUMENTS

| | | |
|---|---|---|
| 0048977 | 9/1981 | European Pat. Off. |
| 2110287 | 9/1972 | Fed. Rep. of Germany |
| 2642272 | 5/1977 | Fed. Rep. of Germany |
| 3025487 | 1/1981 | Fed. Rep. of Germany |
| 3312575 | 7/1984 | Fed. Rep. of Germany |
| 2168892 | 9/1973 | France |
| 2345003 | 10/1977 | France |

OTHER PUBLICATIONS

Schematic 1, Basic Commercial Circuit dated 5/1/81.
Schematic 2, Revised Circuit dated 12/16/81.
Schematic 3, Single Lamp Version of Schematic 2 dated 7/7/82.
Schematic 4, Low Voltage Supply Revision and Two Lamp Version dated 5/7/82.

*Primary Examiner*—Saxfield Chatmon
*Attorney, Agent, or Firm*—Hill, Van Santen, Steadman & Simpson

[57] ABSTRACT

An electronic ballast circuit for fluorescent or other gaseous discharge lamps includes a resonant half-bridge inverter circuit. The source voltage to the inverter is a full-wave rectified line voltage together with a DC carry-over voltage for supplying power in the intercusp period of the recitified line voltage. A negative feedback circuit is responsive to lamp current to vary the inverter drive frequency and thereby regulate lamp current. The frequency response of the feedback loop is high enough and the gain-versus-frequency response of the inverter is such that lamp current and voltage are regulated to reduce the crest factor of lamp current to compensate for variation in the amplitude of the voltage across the semi-conductor switches.

19 Claims, 6 Drawing Figures

U.S. PATENT DOCUMENTS

| | | | |
|---|---|---|---|
| 4,259,614 | 3/1981 | Kohler | 315/DIG. 7 |
| 4,277,728 | 7/1981 | Stevens | 315/307 |
| 4,287,468 | 9/1981 | Sherman | 323/322 |
| 4,291,254 | 9/1981 | Arlt et al. | 315/307 |
| 4,329,627 | 5/1982 | Holmes | 315/209 R |
| 4,334,183 | 6/1982 | Hauenstein | 323/235 |
| 4,356,433 | 10/1982 | Linden | 315/308 |
| 4,358,716 | 11/1982 | Cordes et al. | 315/306 |
| 4,392,086 | 7/1983 | Ide et al. | 315/174 |
| 4,414,493 | 11/1983 | Henrich | 315/308 |
| 4,435,749 | 3/1984 | Grubbs | 363/58 |
| 4,441,054 | 4/1984 | Bay | 315/219 |
| 4,442,382 | 4/1984 | Fleck | 315/287 |
| 4,461,980 | 7/1984 | Nilssen | 315/225 |
| 4,463,286 | 7/1984 | Justice | 315/219 |
| 4,464,606 | 8/1984 | Kane | 315/158 |
| 4,471,269 | 9/1984 | Ganser et al. | 315/307 |
| 4,477,748 | 10/1984 | Grubbs | 315/307 |
| 4,498,031 | 2/1985 | Stupp et al. | 315/307 |
| 4,523,131 | 6/1985 | Zansky | 315/307 |
| 4,585,974 | 4/1986 | Stupp et al. | 310/307 |
| 4,682,084 | 7/1987 | Kuhnel et al. | 315/307 |

OTHER PUBLICATIONS

Schematic 5, Low Voltage Supply Revision and Four Lamp Version dated 5/7/82.

Schematic 6, Revised Two Lamp Version of Schematic 2.

Schematic 7, Circuit Diagram of Semiconductor Chip U1 in Schematics 1–6.

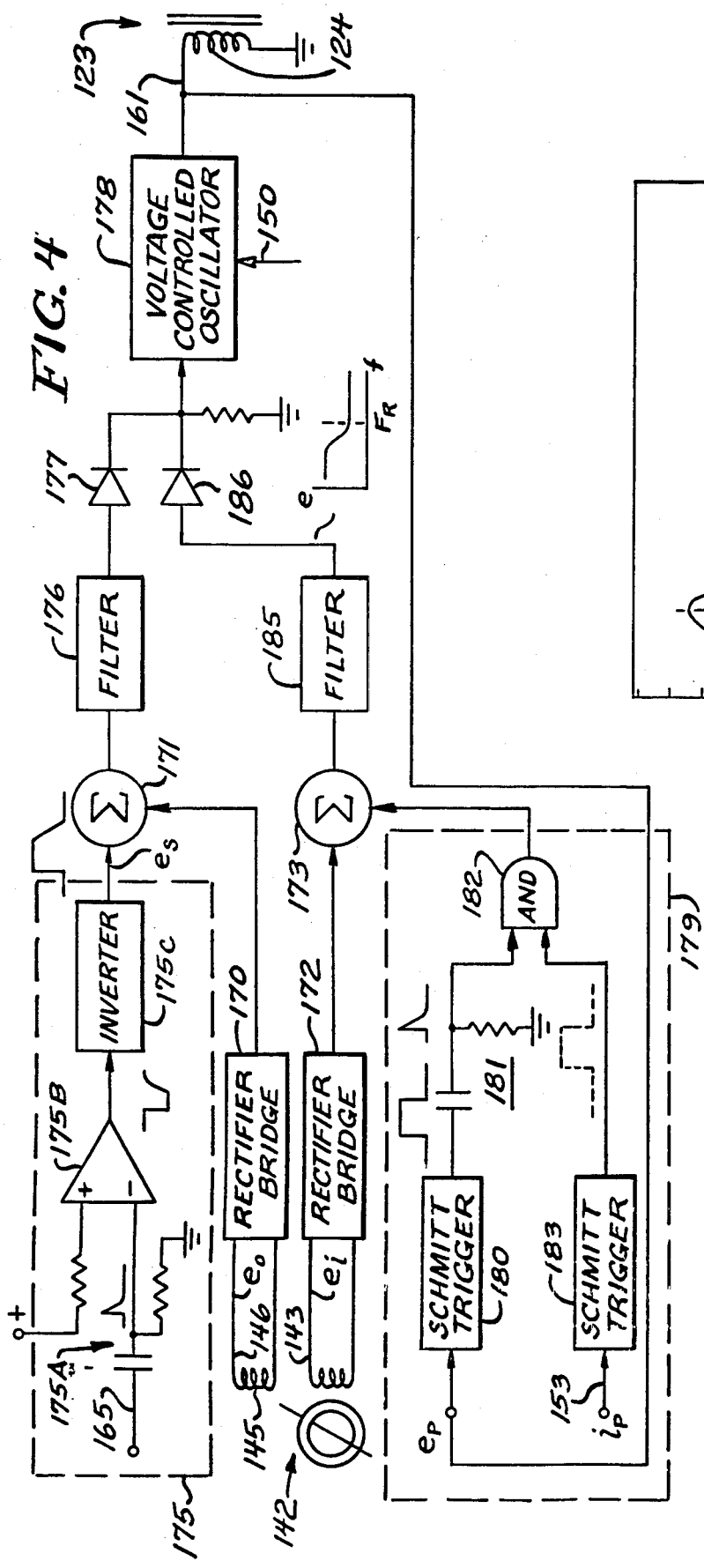
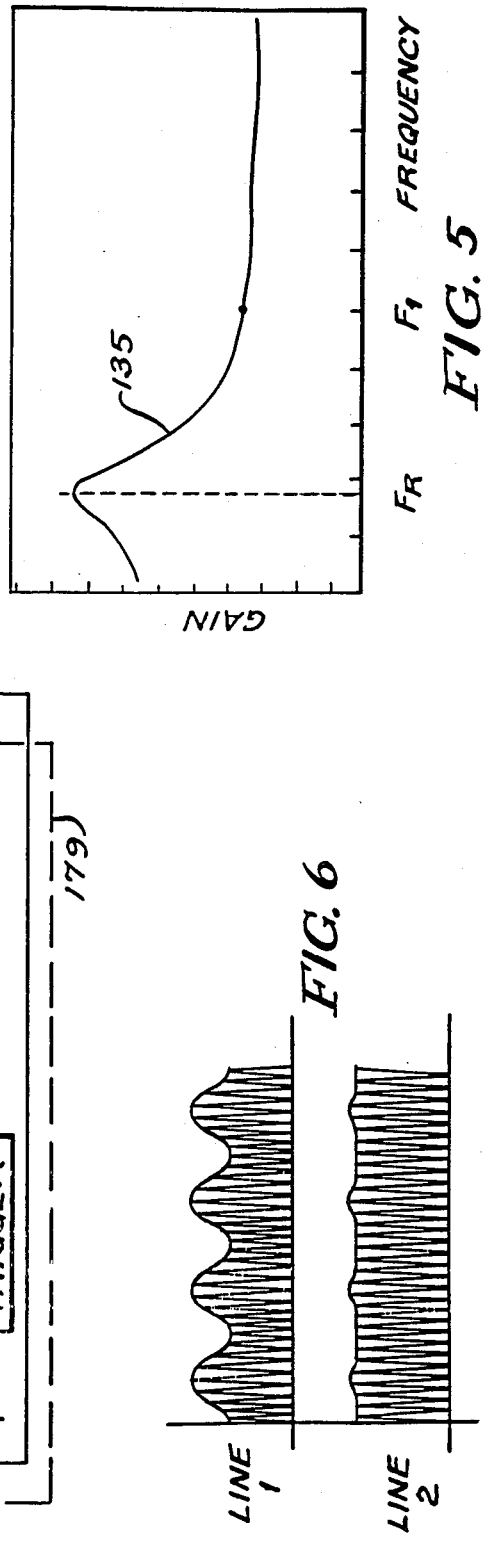

ELECTRONIC BALLAST CIRCUIT FOR FLUORESCENT LAMPS

RELATED APPLICATION

This is a continuation of application Ser. No. 661,397, filed Oct. 16, 1984, now abandoned, which is a continuation-in-part of application of my coowned application entitled "Solid State Ballast", Ser. No. 194,783, filed Oct. 7, 1980, now U.S. Pat. No. 4,477,748, the subject matter of which is incorporated herein in its entirety.

FIELD OF THE INVENTION

The present invention relates to a ballast circuit for fluorescent or other gaseous discharge lamps. More particularly, it relates to an electronic ballast circuit for energizing fluorescent lamps at high frequency from a conventional 60 Hz power source.

BACKGROUND OF THE INVENTION

As used herein, the term "fluorescent" is intended to include other gaseous discharge lamps such as high-intensity discharge lamps. It is known that these lamps operate more efficiently at frequencies higher than 60 Hz. Typically, such frequencies may range from 15 KHz to as high as 100 KHz. In the prior art, there have been many suggestions of electronic ballast circuits capable of high frequency operation, and there have also been commercial attempts to provide such electronic ballasts.

It has recently been recognized that to obtain longer life on fluorescent lamps designed for high frequency operation, the lamp current should be regulated to a degree higher than some may have thought necessary in earlier ballast circuits. There is a problem in obtaining a highly regulated lamp current because, in a ballast intended for residential or commercial use, conventional 60 Hz line voltage is the only practical source of power. Even when full-wave rectified, so that a 60 Hz source in effect becomes a 120 Hz source, there is substantial variation in the amplitude of the source voltage fed to the power transformer which normally energizes the lamp load. If this variation in amplitude is reflected in applied lamp current, it is undesirable because it is believed any such variation will reduce effective lamp life.

A measure or factor sometimes used by lamp manufacturers to limit or define operating specifications of a ballast to ensure longer lamp life is the "crest factor" which is defined as the ration of the peak amplitude of the lamp current to the rms value of lamp current. Some lamp manufacturers require, at least for certain lamps, that the crest factor of a solid state ballast operating at high frequency be less than 1.6. Such crest factors have not been attainable by the circuit as disclosed in my above-identified application Ser. No. 194,783. One of the reasons that desirable values of crest factor are not obtainable by the circuit as disclosed in that application is that the voltage is permitted to go to zero volts between the cusps of the full wave rectified source voltage. (This period between the peaks or cusps of the rectified voltage, when the voltage goes to zero volts, or to carry-over voltage if any auxiliary supply is used, is referred to as the "inter-cusp" period.) Even if an auxiliary source of DC voltage is used to store energy (as in a capacitor, for example), crest factors of less than 1.6 are nevertheless difficult to attain in such a system without auxiliary filters or unduly large values of components, which results in larger sizes of components, and that defeats some of the primary purposes of a solid state ballast—namely, reduction in the size of components and increased operating efficiency.

In some electronic ballasts, the crest factor is improved simply by adding large filters to the full wave rectified source voltage, but, in turn, adding bulky and costly components and reducing the overall efficiency of the ballast.

Thus, a principal object of the present invention is to provide an electronic ballast circuit for fluorescent lamps which regulates lamp current such that the crest factor of lamp current achieves a value of less than 1.6. It is further object of the present invention to do so without adding bulky and expensive filter components for filtering the source voltage.

SUMMARY OF THE INVENTION

The present invention includes a half-bridge inverter circuit designed to resonate at a predetermined high frequency. A negative feedback circuit senses lamp current and varies the excitation frequency of the lamp circuit to regulate lamp current. In particular, the frequency response of the feedback circuit is sufficiently high so that it is capable of responding to amplitude changes in the source voltage. In this manner, the lamp current may be regulated to a high degree, sufficient to reduce the crest factor of lamp current to values less than 1.6, if desired.

In the illustrated embodiment, the lamp current is sensed and a signal is generated representative of lamp current. The feedback loop contains a variable frequency oscillator which generates the gating signal for the semi-conductor switches of the inverter and thereby determines the operating frequency of the inverter. The inverter circuit itself, sometimes referred to herein as te "resonant amplifier" is therefore driven at a predetermined, controlled frequency which preferably is in a range of frequencies slightly above the actual resonant frequency of the inverter. Sensed lamp current controls the inverter frequency such that as lamp current is sensed to increase, the operating frequency is increased, thereby resulting in a reduced gain of the resonant amplifier, and a reduced voltage applied to the lamp circuit. That is, as the inverter driving frequency is increased, the response or "gain" of the inverter decreases. In this manner, lamp current can be regulated to achieve the desirable crest factors indicated above.

Other features and advantages of the present invention will be apparent to persons skilled in the art from the following detailed description of a preferred embodiment accompanied by the drawing.

BRIEF DESCRIPTION OF THE DRAWING

FIG. 4 is schematic diagram, partly in functional block form, of the timing and frequency control circuitry of FIG. 3;

FIG. 5 is a plot of gain versus frequency of the inverter circuit of FIG. 3; and FIG. 6 contains graphs of idealized wave forms illustrating the performance of the operation of the circuitry of FIG. 3.

DETAILED DESCRIPTION OF PREFERRED EMBODIMENTS

Since the subject matter of co-pending application Ser. No. 194,783 has been expressly incorporated herein by reference, and because the preferred embodiment of the invention employs a different circuit configuration and technique in the feedback loop configuration, it is not necessary to repeat all the circuit detail of said application Ser. No. 194,783. However, in order to provide a foundation for a better understanding of the improvements rendered by the preferred embodiment, a brief description will be given of the circuitry of said co-pending application which regulates lamp current. Many other features and functions are disclosed in the referenced copending application, but do not form a part of the instant invention which is independent of those features, and they need not be repeated here.

Figure 1:
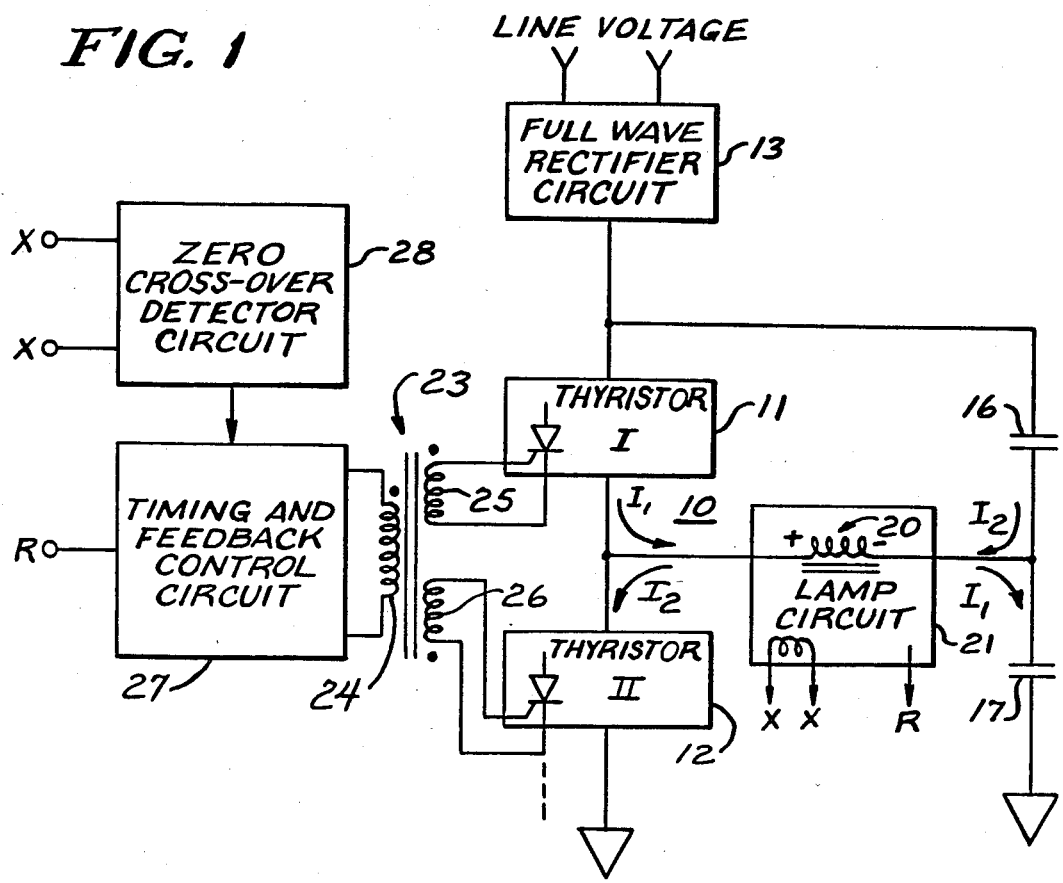
FIG. 1 is a functional block diagram of an electronic ballast circuit using negative feedback to regulate lamp current.
Figure 2:
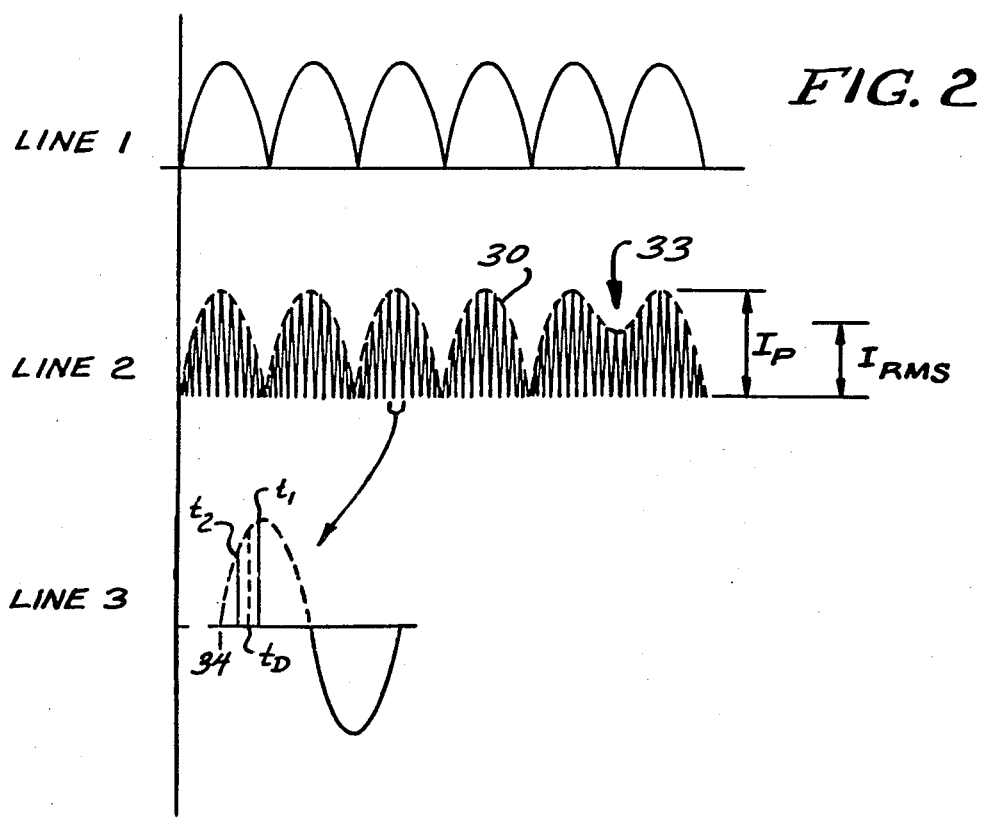
FIG. 2 shows idealized wave forms of signals illustrating the operation of the circuitry of FIG. 1.

Turning then to FIG. 1, reference numeral 10 generally designates a thyristor/capacitor bridge circuit including first and second thyristors (silicon control rectifiers) 11, 12 connected in series with a full-wave rectifier circuit 13 which receives standard 60 Hz line power and converts it to a full-wave rectifier circuit 13 which receives standard 60 Hz line power and converts it to a full-wave rectified output signal of 120 Hz, such as is illustrated in idealized form on line 1 of FIG. 2.

The bridge circuit 10 also includes first and second balanced capacitors 16, 17 connected in series to form two legs of the bridge. The diagonal branch of the bridge includes a power transformer generally designed 20, the output of which is coupled to a lamp load circuit comprising gaseous discharge lamps, such as fluorescent lamps, diagrammatically represented by the block 21.

The value of capacitors 16 and 17, and the inductance (including any reflected impedance from the load) of transformer 20 form a resonant circuit when thyristors 11, 12 are conducting.

The thyristors 11, 12 are gated "on" by a signal coupled through a pulse transformer generally designed 23. The transformer 23 includes a primary winding 24 driven by the Timing and Feedback Control Circuit 27, and first and second secondary windings 25, 26 which are connected in circuit respectively with the gate leads of thyristors 11, 12 in such a manner that current flowing through primary winding 24 of transformer 23 in one polarity will cause thyristor 11 to conduct, and current flowing through the primary winding 24 in the opposite polarity will cause thyristor 12 to conduct.

Timing for the Timing and Feedback Control Circuit 27 is derived from a Zero Cross-Over Detector Circuit 28 which receives a signal from a secondary winding in the power transformer 20. That signal is designated X-X, and the Zero Cross-Over Detector Circuit 28 generates a pulse each time the load current reverses polarity.

A signal designated R is generated in the lamp circuit representative of lamp current. The signal R is a level signal (not a sinusoidal signal) having a magnitude representative of a value of lamp current averaged over a number of cycles of the high frequency lamp current.

As explained above, when thyristor 11 conducts, capacitor 16 discharges at least partly, and a current represented by arrows $I_1$ flows through thyristor 11 and the primary of transformer 20 from the positive to the negative terminal, and thence through capacitor 17 to ground. Because the transformer 20 and capacitors 16 and 17 form a resonant circuit, the current $I_1$ will reverse in polarity dependent upon the resonant frequency of the circuit, and thereafter thyristor 12 will be gated to conduction with current flowing in the direction of the arrows $I_1$. Thyristor 11 will be non-conducting at this time.

Thus, a high-frequency current oscillating at a frequency (which may be, for example, in the range of 20 KHz to 50 KHz) is generated in the lamp circuit and coupled to energize the lamp load. The positive half of the symmetrical resulting wave form at the output of the power transformer 20, again in idealized form, is seen on line 2 of FIG. 2. The envelope of the wave form is shown in phantom as a series of cusps and designated 30. It corresponds to the frequency and same general shape as the 120 Hz rectified line voltage of line 1. The lamp current goes to zero as the source voltage goes to zero during the inter-cusp period. A storage capacitor may be used to supply a carry over voltage in the inter-cusp period, in which case the envelope may be as seen at 33 on line 2. In either case, since the lamp current will have a generally similar envelope, the crest factor for lamp current is undesirably high.

To further explain the operation of the current regulating feature of the circuit of FIG. 1, an individual cycle of lamp current is shown, once more in idealized form, on an expanded time scale of line 3 of FIG. 2. It is sinusoidal in form, though, as mentioned above, the peak-to-peak value of that wave will depend upon the magnitude of the rectified source voltage.

Referring then to FIG. 1, the Zero Cross-Over Detector Circuit 28 generates a signal at a time represented in FIG. 2 by reference numeral 34 when current $I_1$ or $I_2$ goes through a zero value. The timing portion of the control circuit 27 thereupon establishes a fixed time delay represented diagrammatically by the arrow $t_D$ in line 3. If the lamp current, represented by the value of the signal R is a value which corresponds to a predetermined or reference value of current reflecting a desired lamp current, then the thyristor which is to be fired will be triggered at the end of the time $t_D$. If the value of the signal R is greater than the predetermined reference value, indicating that lamp current is greater than desired, the feedback control circuit 27 delays the timing pulse proportionately so that, for example, the thyristor to be gated will not be gated on until a time $t_1$. This will reduce the energy coupled to the resonant circuit and thus it will reduce the voltage applied to the power transformer 20. If, on the other hand, the magnitude of the signal R is less than the reference signal, it indicates that lamp current is less than the predetermined value, and the triggering of the thyristors will be advanced such as is illustrated at $t_2$ in line 3, causing more energy to be coupled to the power transformer 20 since the thyristors will be energized earlier in the cycle of inverter current.

In this manner, lamp current is regulated as explained in my co-pending application. However, the response time of the feedback control circuit for the system of FIG. 2 is relatively slow—that is, of the order of a few tenths of a second. In other words, the −3 db point of the frequency response characteristic of the feedback circuit is of the order of 2-5 cy/sec. As a result, the amplitude of voltage applied to thelamp circuit and the amplitude of lamp current vary in accordance with the envelope of the voltage wave form seen on line 2. The resulting crest factor for lamp current is, as explained above, undesirable from the standpoint of criteria established by lamp manufacturers for longevity of lamps. Specifically, if the envelope of the signal of line 2 with the intercusp voltage going to zero represents peak lamp current and the arrow designated $I_{RMS}$ designates rms lamp current; and the crest factor has a value nominally in the range of 2.0-3.0.

Figure 3:
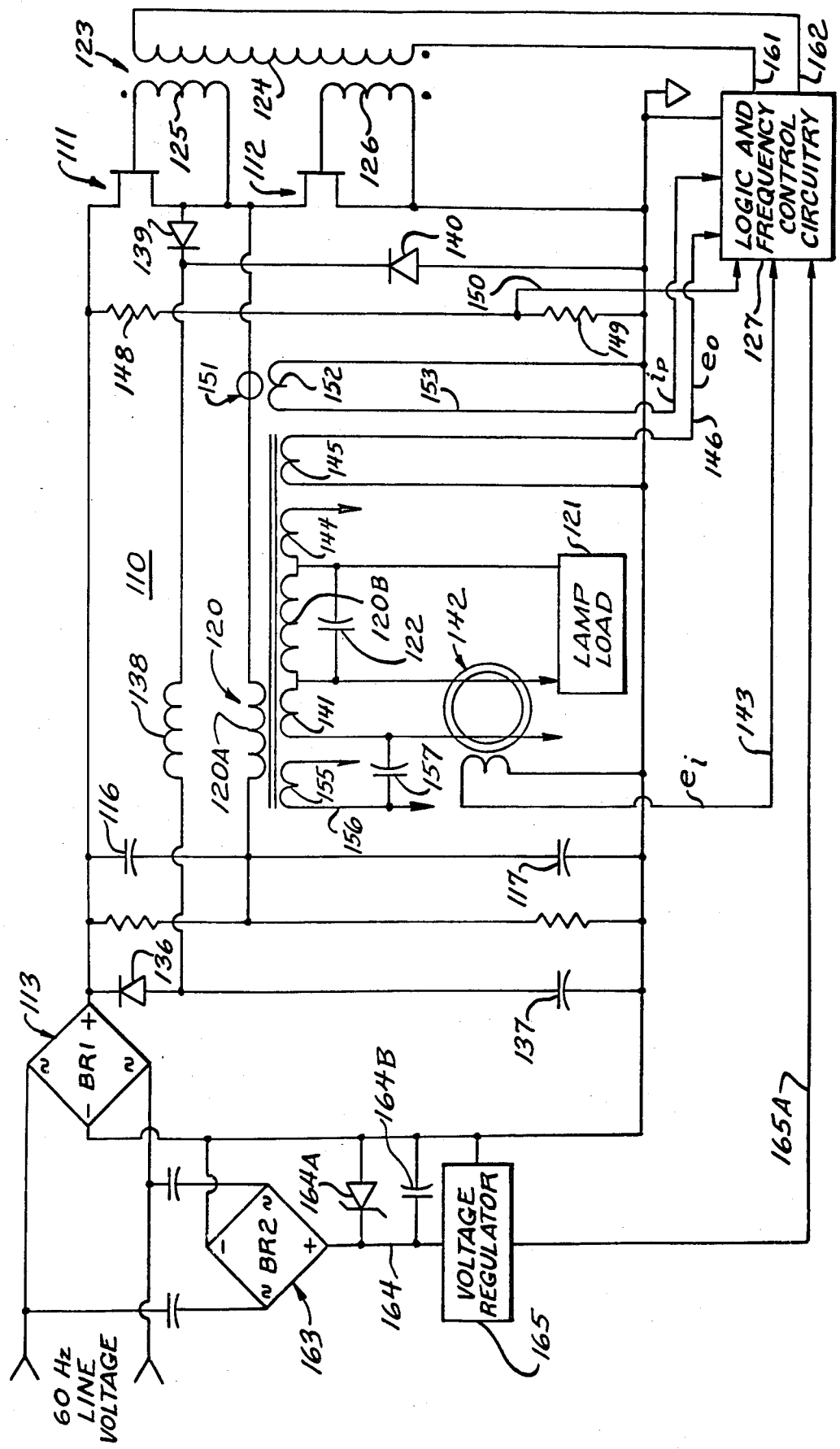
FIG. 3 is a circuit schematic diagram, partly in functional block form, of an electronic ballast for gaseous discharge lamps constructed according to the present invention.

Turning now to FIG. 3, there is shown a preferred circuit for achieving a regulated lamp current with reduced amplitude modulation of the voltage applied to the lamps and an improved crest factor for a lamp current. To facilitate comparison with the circuitry of FIG. 1, components in the circuit of FIG. 3 which have a similar function to those identified in FIG. 1 will be identified with a corresponding reference numeral preceded by a "1." Thus, an inverter in the form of a half-bridge circuit is generally designated 110. It includes first and second semi-conductor switches 111, 112. The controlled switches illustrated are MOSFET transistors, although other semiconductor switches may also be used. MOSFET transistors were selected because of their higher frequency response, enabling the inverter frequency to be increased and thereby reducing the size of other components. The nominal operating frequency of the inverter of FIG. 3 is in the range of 50-100 KHz, and the nominal resonant frequency is 50 KHz. MOSFET transistors are suited to this application because, as will be appreciated from an understanding of the circuit, they are turned "on" (i.e., to a state of conduction) when no forward current is flowing in the branch in which the MOSFET is located, and they are turned "off" when forward current is flowing. This suits the application to the faster turn on and turn off times of MOSFET transistors compared, for example, to those of bipolar transistors.

Still referring to FIG. 3, the inverter circuit 110 includes capacitors 116 and 117 in the other branches. To energize the inverter circuit 110, 60 Hz line voltage is connected top a rectifier bridge circuit 113, the output of which is fed to the inverter circuit 110, as illustrated. A power transformer generally designated 120 has a primary winding 120A connected between the common junction of the transistors 111, 112 and the common junction of the capacitors 116, 117—that is, the power transformer 120 is connected in the diagonal branch of the bridge circuit 110. A first secondary winding designated 120B feeds the lamp load circuit 121 which may include fluorescent or other gaseous discharge lamps, such as high intensity discharge lamps, in any number of configurations. A capacitor 122 is connected across the secondary winding 120B and forms the capacitive reactance in combination with the inductive reactance of the transformers 120 to define the resonant frequency of the inverter which in the illustrated embodiment is approximately 50 KHz, as indicated.

The transistors 111, 112 are triggered at mutually exclusive times by a drive transformer 123 having a primary winding 124 which is connected to the output of a logic and frequency controlled circuitry 127. Transformer 123 also has a first secondary winding 125 which is connected to the gate of transistor 111, and a second secondary winding 126 which is connected to the gate of transistor 112 as seen. The details of the logic and frequency control circuitry 127 will be described in connection with FIG. 4, and it is analogous to the logic and feedback control circuitry 27 of FIG. 1 in that it is responsive to a signal representative of lamp current to regulate the value of lamp current. The circuitry 127, however, does so in a different manner. Specifically, the circuitry 127 cooperates with and takes advantage of the frequency response characteristic of the bridge 110 and controls the operating frequency of the bridge in relation to its resonant frequency to achieve an overall desired output or "gain" in achieving current regulation. This can be seen by referring to FIG. 5 in which reference numeral 135 designates a curve showing the relationship between frequency and the gain of the inverter circuit or "resonant amplifier" as it is sometimes called. In this context, the resonance of the amplifier is defined, as indicated above, primarily by the capacitor 122 and the leakage inductance of the power transformer 120.

Referring then to FIG. 5, the resonant frequency of the inverter is designated $F_R$ and as can be seen, as the frequency of operation increases above the resonant frequency, the gain of the inverter decreases. Further, it will be observed that the gain decreases monotonically, though not necessarily linearly between the resonant frequency $F_R$ and a frequency $F_1$. In a manner to be made clear presently, the frequency control circuitry 127 senses average lamp current and generates an output signal which is coupled to the transformer 123 to gate the transistors 111, 112 in alternate half-cycles. The frequency of that gating or triggering signal is increased as lamp current increases, thereby to decrease the voltage applied to the lamp load circuit at the secondary winding 120B, resulting in lowering the lamp current.

Returning to FIG. 3 once more, a carry-over voltage is supplied for supplying energy between the peaks of the 120 Hz full wave rectified source voltage. The carry-over voltage circuitry includes a diode 136 having its cathode connected to the positive output of the full wave rectifier bridge circuit 113 and its anode connected to a storage capacitor 137. The junction between diode 136 and capacitor 137 is coupled by means of an inductor 138 and a diode 139 to the junction between the transistors 111, 112 which, it will be observed, is also an input terminal to the primary winding 120A of power transformer 120. The half wave rectifier formed by diode 139 and 140 provides a voltage equal to one half peak supply voltage and permits capacitor 137 to be charged from the high frequency output of the inverter circuit rather than from the line supply; thereby minimizing line current distortion and retaining a high input power factor. Briefly, the capacitor 137 is relatively large to provide storage of sufficient energy. It is charged through diode 139 and inductor 138, and it discharges through diode 136 when amplitude of the output voltage of the bridge circuit 113 falls below the level of voltage stored across capacitor 137. A diode 140 may be connected as shown across diode 139 and transistor 112.

Turning now to the signal inputs to the Logic and Frequency Control Circuitry 127, a first input signal is derived from a secondary winding 141 of transformer 120 which may be coupled to a filament circuit for one or more lamps in the load circuit 121. A current transformer generally designated 142 senses the current flowing in the load of the secondary winding 141 and generates a signal $e_i$ on line 143 which is representative of lamp load current. Additional lamp filaments may be energized by a secondary winding 144. Another secondary winding 145 generates a signal, $e_o$, which is representative of lamp voltage. The signal $e_o$ is also fed to the Logic and Frequency Control Circuitry 127 along line 146 and is used for lamp voltage limiting as discussed further below. Still another secondary filament winding of transformer 120 is designated 155 having an output lead 156 which is coupled with a starting capacitor 157 to the high voltage secondary.

First and second resistors 148, 149 may be connected in series across the transistors 111, 112 to form a voltage divider; and the signal at the junction between the resistors 148, 149 is representative of the amplitude of the source voltage. That signal is fed along a lead 150 to the Logic and Frequency Control Circuitry 127 and may be used to protect against source over-voltage.

A current transformer 151 senses current flowing in the primary of transformer 120 and including a secondary winding 152. The signal on line 153 is designated $i_p$ and represents the phase of local current. It is coupled along a line 153 to an input of the Logic and Frequency Control Circuitry 127.

The output leads of the Logic and Frequency Control Circuit are designated 161 and 162; and they are connected directly to the terminals of the primary winding 124 of transformer 123.

Power for the Logic and Frequency Control Circuitry 127 is derived from a conventional bridge rectifier circuit generally designated 163 which is capacitively coupled to the line voltage and which generates an output signal on a line 164 coupled through a conventional voltage regulator circuit 165 to generate logic and control power for the circuitry 127. A zener diode 164A and filter capacitor 164B are also connected as shown, as in conventional.

Turning now to FIG. 4, the Logic and Frequency Control Circuitry 127 is seen in functional block form. The secondary winding 145 of power transformer 120 and lead 146 on which the signal $e_o$ appears are repeated. The signal $e_o$ is representative of lamp voltage, and it is coupled through a bridge rectifier circuit 170 to a summing junction 171. Similarly, the signal $e_i$ representing lamp current generated on line 143 from current transformer 142 is coupled through a bridge rectifier circuit 172 to a summing junction 173.

The other input from summing junction 171 is a signal designated $e_s$ which is generated by a start circuit enclosed within dashed line 175. The start circuit 175 is actuated by the voltage signal on line 165A when power is turned on and voltage is sensed at the output of the low voltage regulator 165. The start circuit includes a differentiator 175A which feeds the negative input of an operational amplifier 175B, the output of which is inverted by inverter 175C. The start circuit generates an output voltage for a predetermined time as graphically illustrated in FIG. 4, and it then has a gradual fall time, reducing to zero volts. The purpose of the start circuit 175 is to force the operating frequency to a high value during start-up so that the lamp filaments may be heated for a time before voltage is applied to the lamps. The output of summing junction 171 is fed through a filter 176 and a diode 177 to the input terminal of a voltage controlled oscillator 178. The output frequency of the voltage controlled oscillator 178 increases as the input voltage increases.

The other terminal of summing junction 173 is received from the output of a phase detector circuit enclosed within dashed lime 179. One input to the phase detector circuit 179 is received on line 153 from current transformer 151 and is representative of the phase of inverter current, ip. The other input signal to phase detector 179 is the drive signal on line 161 which is coupled to the primary 124 of the drive transformer 123. This signal is representative of the phase of the voltage across the primary since it determines the triggering of the semiconductor switches 111, 112 as indicated above. That signal is coupled to a first Schmitt trigger circuit 180 to square it and a differentiator 181 to an AND gate 182. The signal $i_p$ is fed to a second Schmitt trigger circuit 183 to the other input of AND gate 182.

Phase detector circuit 179 has a characteristic as diagrammatically illustrated in FIG. 4. When the drive frequency of the semi-conductor switches is near the resonant frequency $F_R$ of the resonant inverter amplifier, the output signal of the phase detector 179 is a positive voltage. As the operating frequency of the inverter increases above the resonant frequency, indicating that the current $i_p$ lags the voltage $e_p$, the output voltage is zero. As the operating frequency of the inverter falls near or below the resonant frequency, the phase angle of current becomes leading and the output voltage increases. That output voltage is fed to the summing junction 173. The output of the summing junction 173 is fed through a filter 185 and a diode 186 to the input of the voltage control oscillator 178.

OPERATION

As explained above, the frequency of the voltage control oscillator 178 determines the operating frequency of the inverter. As that frequency increases from the resonant frequency, the gain of the inverter will decrease continuously. During start-up, the start circuit 175 generates the signal $e_s$ which is coupled through the junction 171, filter 176 and diode 177 to the input of voltage control oscillator 178 to set the operating frequency at a high value. Thus, lamp voltage is low until the filaments are heated. The output signal of the start circuit 175 will then ramp down to zero volts, and under normal conditions, the voltage applied to the lamp circuit will increase as the frequency of the voltage controlled oscillator 78 decreases, thereby decreasing the drive frequency of the semiconductor switches 111, 112.

As the start voltage begins to ramp down, at the end of the predetermined time indicated at $T_1$, the inverter drive frequency will decrease toward resonant and the voltage applied to the lamps will correspondingly increase. As the start voltage ramps down and the inverter frequency decreases, the applied voltage to the lamps will increase, thereby also causing an increase in the signal $e_o$ on line 146. The voltage applied to the lamps will continue to increase until the lamps ignite or $e_o$ increases sufficiently to limit the decrease in drive frequency.

When the lamps ignite, the signal $e_o$ will decrease since the voltage across the lamps will decrease; and the signal $e_i$ representative of lamp current coupled to the other summing junction 173 will be the controlling signal, as described above. As mentioned, the drive frequency of the inverter will normally be in the range above resonant frequency. Should the drive frequency decrease toward resonance, the output of the phase detector circuit 179 will be added to the output of the rectifier 172 at summing junction 173, thereby prohibiting operation beneath the resonant frequency.

Assuming normal operation, namely that the operating frequency of the inverter is above resonance, and the output signal of the phase detector circuit 179 will be at zero volts, the output signal of rectifier 172 (which is representative of lamp current) will control. As the lamp current signal increases, the frequency of voltage controlled oscillator will also increase and the gain of the inverter will be reduced. As the signal representative of lamp current decreases, on the other hand, the frequency of the voltage controlled oscillator 178 will decrease, thereby increasing the gain of the inverter circuit. Thus, the lamp current is regulated. If the operating frequency of the inverter becomes too low—that is, if it reduces beneath the resonant frequency of the inverter, then the output signal of the phase detector 179 will increase and thereby limit the lower operating frequency of the voltage controlled oscillator 178. Thus, the phase detector circuit 179 defines a lower limit to the operating frequency range of the inverter.

Should the applied voltage to the lamp circuit increase beyond the normal operating range (as might occur if a lamp burns out or is removed), the signal $e_o$ on line 146 increases to drive the frequency of the voltage controlled oscillator 178 to a higher frequency and thereby reduce the gain of the inverter and avoid an over-voltage condition. It will be observed that the function of the diodes 177, 186 is to provide that the higher output signal from either summing junction 171 or summing junction 173 be effective to drive the voltage controlled oscillator 178. That is, the two output signals of the summing junctions are not added. Rather, the signal having the greater magnitude controls the operating or drive frequency.

The characteristic of the voltage-to-frequency converter 178 is such that as the input signal increases, the frequency of the output signal also increases. To illustrate the effect of increasing the frequency of the signal coupled to the drive transformer 123, reference is made to FIG. 5 and the characteristic 135. As the operating frequency increases, the gain will diminish, thereby reducing the amplitude of the voltage at the secondary winding 120B of transformer 120 and consequently reducing lamp current. By designing the circuitry of FIG. 4—namely, the feedback control circuitry or frequency control circuitry as it is sometimes referred, to have a frequency response such that its minus 3 db frequency point is approximately 5 KHz for a resonant frequency of 50 KHz ($F_R$ if FIG. 5), a crest factor of 1.6 or less can be achieved. Thus, not only is lamp current regulated, but also rendered relatively insensitive to variations in the source voltage. By way of illustration, referring to FIG. 6, line 1 diagrammatically illustrates the envelope of the voltage applied to the primary winding 120A of power transformer 120, but due to the regulating effecting achieved by varying the drive frequency to the inverter, the output voltage of the transformer 120 is seen as represented in an idealized form on line 2 of FIG. 6.

Whereas in the illustrated embodiment, the operating frequency range was greater than the resonant frequency of the inverter amplifier, persons skilled in the art would be able to modify the system which has been disclosed and operate on other portions of the frequency characteristics, such as before the resonant frequency.

Having thus disclosed in detail preferred embodiments of the invention, persons skilled in the art will be able to modify certain of the circuitry which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. An electronic circuit for energizing a lamp circuit including at least one gaseous discharge lamp from a source of electrical power having a voltage amplitude varying in time, comprising: resonant inverter circuit means receiving power from said source and having a resonant frequency and including first and second controlled switches gated to conduction respectively in alternate cycles of inverter frequency for generating a high frequency electrical signal for supplying power to said lamp circuit; sensing circuit means for generating a control signal representative of lamp current; feedback control circuit means for controlling the gating of said controlled switches in response to said control signal for controlling the operating frequency of said inverter circuit means relative to the resonant frequency thereof to regulate lamp current to a predetermined value; and characterized in that said feedback control circuit has a frequency response characteristic which is defined by a cut-off frequency sufficient to permit said feedback control circuit to respond to said amplitude variations in said source voltage thereby to reduce the amplitude variation in the applied lamp voltage and lamp current.

2. The circuit of claim 1 wherein said source of electrical power includes rectifier circuit means receiving power from a 60 Hz input line for generating electrical power for said inverter circuit; and a source of carry-over voltage storing energy when the output of said rectifier circuit means is sufficient to supply energy to said inverter circuit means and itself supplying energy to said inverter circuit means when the output of the rectifier circuit means is insufficient to supply energy to said inverter circuit means.

3. The circuit of claim 2 characterized in that the range of operating frequencies of said inverter circuit means as determined by said feedback control circuit means is above the resonant frequency of said inverter circuit means and wherein said feedback control circuit means includes variable frequency oscillator circuit means responsive to said control signal for increasing the frequency of the drive signal to gate said controlled switches as lamp current increases from a reference value.

4. The circuit of claim 3 wherein said controlled switches are semi-conductor switches connected in series and energized to conduction in mutually exclusive time periods.

5. The circuit of claim 4 wherein said semiconductor switches are MOSFET transistors.

6. The circuit of claim 1 wherein said feedback control circuit means includes a variable frequency circuit for energizing said controlled switches at a controlled frequency, said variable frequency circuit means being responsive to said control signal for changing the drive frequency of said controlled switches in response to said control signal.

7. The circuit of claim 6 wherein said feedback control circuit means is characterized in that the normal operating frequency of said variable frequency circuit means is greater than said resonant frequency of said inverter circuit means, said feedback control circuit means further including phase detector circuit means responsive to signals representative of the phase of said lamp current and the phase of said applied lamp voltage for generating an output signal when the operating frequency of said variable frequency circuit means approaches said inverter resonant frequency to limit the operating frequency thereof to a frequency no lower than said resonant frequency.

8. The circuit of claim 7 further comprising start circuit means responsive to the intial application of power to said current for generating an output signal to cause said variable frequency circuit means to generate a drive frequency which is high in relation to the normal operating frequency thereby to reduce the gain of said inverter circuit means during an intial start-up period sufficient to enable the filament of said lamp to heat.

9. The circuit of claim 8 further comprising voltage sensing means sensing lamp voltage for increasing the output frequency of said variable frequency circuit means when said lamp voltage exceeds predetermined value to reduce the gain of said inverter circuit means wherein said lamp voltage is higher than a desired value.

10. An electronic ballast circuit for receiving source voltage at a fixed frequency for energizing a lamp circuit comprising at least one gaseous discharge lamp, comprising: resonant inverter circuit means including first and second controlled semi-conductor switches connected in circuit with first and second capacitors to form an inverter bridge circuit; power transformer means connected in the diagonal branch of said inverter bridge circuit and having a secondary winding coupled to said lamp circuit for energizing the same; a capacitor connected in circuit with the secondary of the power transformer, the inductance of said power transformer and the value of said capacitor at least partially determining the resonant frequency of said inverter circuit means; variable frequency circuit means for generating an output signal coupled to said first and second controlled switch means for causing said first and second controlled switch means to conduct respectively in alternate cycles to generate a high frequency signal for energizing said power transformer; and sensing circuit means sensing lamp current for controlling said variable frequency circuit means to change the operating frequency thereof in response to variations in lamp current and thereby to change the gain of said inverter circuit means and to control lamp current.

11. The circuit of claim 10 further comprising power storage circuit means connected in circuit with said source voltage for storing energy from said source when said source voltage is relatively high and for supplying power to said inverter circuit means when said source voltage is relatively low.

12. The circuit of claim 9 wherein said variable frequency circuit means triggers said first and second switches to drive said inverter circuit means at a frequency higher than said resonant frequency whereby the gain of said inverter circuit means is varied as a function of said drive frequency.

13. The circuit of claim 12 wherein said sensing circuit means generates a signal representative of lamp current and causes said variable frequency circuit means to increase in frequency as lamp current increases thereby to decrease the gain of said inverter circuit and reduce lamp current.

14. The circuit of claim 13 wherein said variable frequency circuit means and said sensing circuit means comprise a feedback control circuit means characterized in having a frequency response sufficient to regulate lamp current for the fundamental frequency of said source voltage.

15. The circuit of claim 14 wherein said feedback control circuit means is characterized in having a frequency response defining a cut-off frequency at least ten times greater than the fundamental frequency of said source voltage.

16. The circuit of claim 15 wherein said feedback control circuit further includes limit circuit means for detecting when the operating frequency of said inverter approaches said resonant frequency for limiting the lower range of the operating frequency of said inverter circuit means.

17. The circuit of claim 16 wherein said limit circuit means comprises a phase detector for comparing a first signal representative of the phase of lamp current and a second signal representative of the phase of applied lamp voltage or determining when the operating frequency approaches said resonant frequency of said inverter circuit means.

18. The circuit of claim 17 wherein said feedback control circuit means further comprises a start-up voltage circuit responsive to intial application of power to said circuit for causing said variable frequency circuit means to operate at a high frequency and thereby reduce the gain of said inverter circuit means for a predetermined time upon start-up and sufficient to enable heating of the filaments of said lamp.

19. The circuit of claim 18 further comprising means for sensing voltage applied to said lamps for generating a signal representative thereof, said signal representative of lamp voltage being coupled to said variable frequency circuit for increasing the inverter frequency if the lamp voltage exceeds a predetermined value.

* * * * *